No. 884,228.
PATENTED APR. 7, 1908.
H. SONNENBERG.
MOLDING MACHINE.
APPLICATION FILED OCT. 31, 1907.
2 SHEETS—SHEET 1.
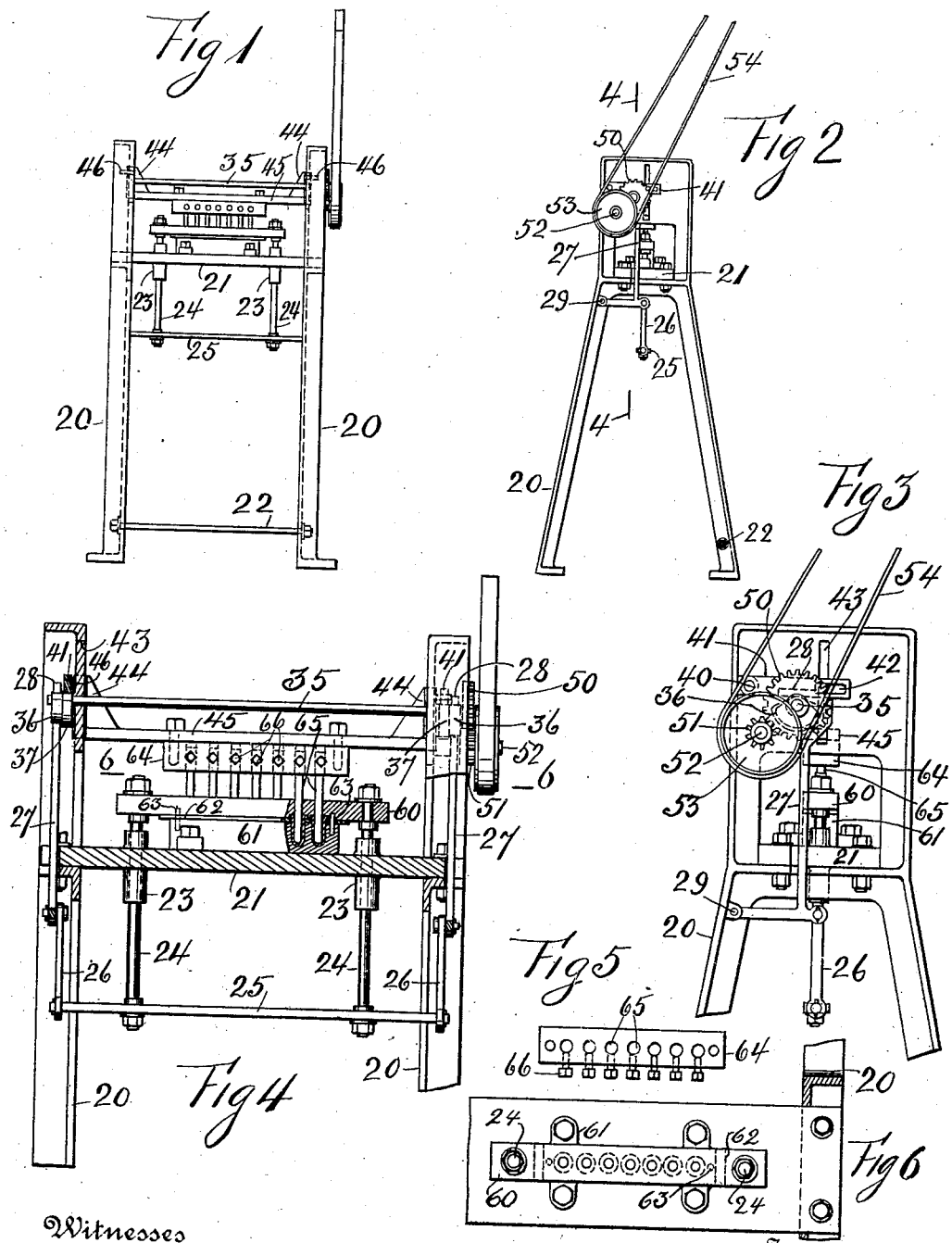
Witnesses
Martin Zimansky.
Sigmund Schüler.
Inventor
Hermann Sonnenberg
By his Attorney
A. de Bonneville No. 884,228.  
PATENTED APR. 7, 1908.
H. SONNENBERG.  
MOLDING MACHINE.  
APPLICATION FILED OCT. 31, 1907.
2 SHEETS—SHEET 2.
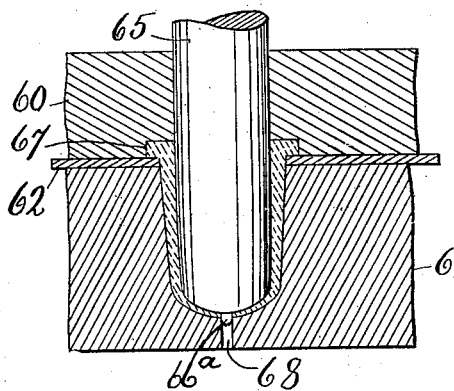
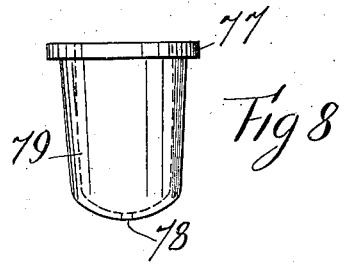
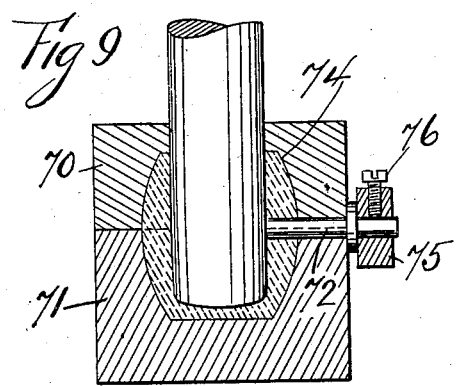
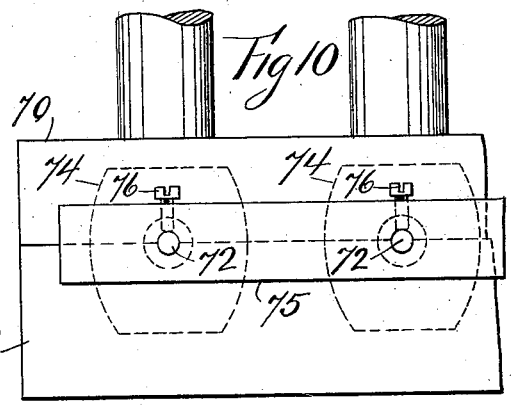
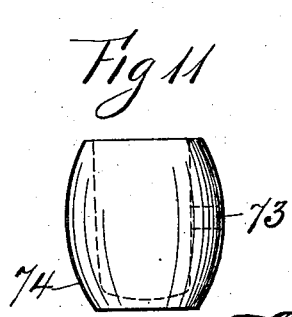
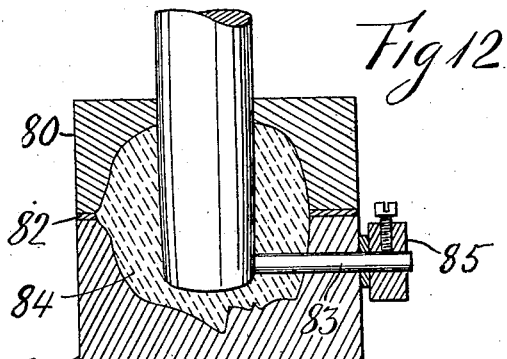
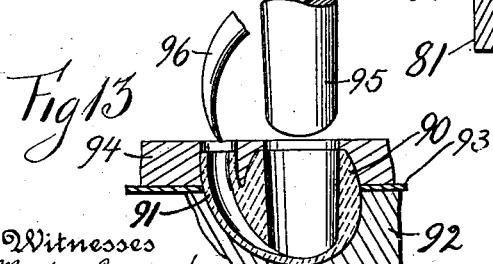
Witnesses  
Martin Zimansky  
Sigmund Schüler  
Inventor  
Hermann Sonnenberg  
By his Attorney

UNITED STATES PATENT OFFICE.

HERMANN SONNENBERG, OF BROOKLYN, NEW YORK.

MOLDING-MACHINE.

No. 884,228.　　　Specification of Letters Patent.　　　Patented April 7, 1908.

Application filed October 31, 1907. Serial No. 400,122.

*To all whom it may concern:*

Be it known that I, HERMANN SONNENBERG, a subject of the Empire of Germany, and resident of the borough of Brooklyn, in the county of Kings and State of New York, have invented certain new and useful Improvements in Molding-Machines, of which the following is a specification.

This invention relates to a molding machine. Its specific object is the production of a pipe molding machine, and its principal point of novelty consists in the construction of the molds to form the objects to be produced.

In the accompanying drawings, Figure 1 represents a front elevation of a molding machine for pipe bowls with the invention incorporated therewith, Fig. 2 shows a right hand side view of Fig. 1, Fig. 3 is a partial enlarged side view similar to Fig. 2, Fig. 4 is a partial enlarged section of Fig. 2 on the line 4, 4, Fig. 5 represents a plan view of the plunger holder, Fig. 6 is a partial section of Fig. 4 on the line 6, 6, Fig 7 is an enlarged portion of Fig. 4, Fig. 8 represents an elevation of an inner bowl for a pipe, Fig. 9 is a modification of Fig. 7, Fig. 10 shows a right hand side view of Fig. 9, Fig. 11 is an elevation of a pipe bowl formed with the molds shown in Figs. 9 and 10, Fig. 12 represents a further modification of Fig. 7. Fig. 13 represents a sectional view of a pipe with its neck and molds for the same.

The molding machine is shown to comprise the side frames 20, which are connected at the upper ends by the table 21, and at their lower ends by the tie rod 22. With the table 21 are formed the guides 23, in which are located the sliding rods 24 that are connected at their lower ends by the cross-bar 25. At the outer ends of said bar are pivoted the links 26, which are pinned to the cam levers 27 having the hooked ends 28. The cam levers are fulcrumed on pins 29 extending from frames 20.

A cam shaft 35 is journaled in the upper portions of the frames 20, and carries at each end the cams 36 and 37. The cams 36 engage with the hooked ends 28 of the cam levers 27. At the upper portions of the frames 20 are also fulcrumed on pins 40 oscillating levers 41, which have elongated openings 42 at the outer ends thereof. The cams 37 engage the levers 41 to raise and lower the same. In the frames 20 are formed vertical elongated openings 43 for the ends 44 of the cross-head 45. Pins 46 extend from said ends 44 and engage with the openings 42 of the oscillating levers 41.

On the cam shaft 35 is fastened the spur gear 50, which meshes with a pinion 51 journaled on a pin 52 extending from one of the side frames 20. The said pinion is fastened to a pulley 53, that is driven by a belt 54.

The sliding rods 24, carry at their upper ends the upper mold 60. On the table 21 is bolted the bottom or lower mold 61, and a separating plate 62 is located between said molds and is held in operative position on pins 63. To the lower face of the cross-head 45 is fastened the plunger holder 64, to which are fastened the plungers 65 by means of the set screws 66. The lower ends of the plungers may have the projections 66ª. The upper mold 60 is formed with a plurality of openings having annular recesses 67, and the lower mold is shown with a plurality of cavities having openings 68. The said recesses form the flange 77 and the teat the opening 78 of the bowl 79.

To use the invention power is transmitted to the pulley 53, which rotates the pinion 51, and the latter rotates the spur gear 50, and hence the cam shaft 35. The cams 36 engaging the cam levers 27, a vertical reciprocating motion is given to the upper mold 60. The cams 37 oscillate the levers 41, and thereby the cross-head 45 with the plungers 65 also receive vertical reciprocating motions. When the upper mold 60 and the cross-head 45 with the plungers 65 are in a raised position, and the separating plate 62 is in position on the lower mold 61, clay or other suitable material is placed in the cavities of said lower mold.

Upon the rotation of the cam shaft 35 the upper mold 60 is lowered to the separating plate 62, and the plungers lowering will spread the clay or other material to take the form of the molds. Next the upper mold and the plungers rise, and when they are sufficiently separated from the lower mold, the separating plate 62 is raised which will raise the object formed out of the lower mold.

In Figs. 9 to 11 there is represented an upper mold 70 and a lower mold 71, and at the joint thereof are formed openings for the rods 72, that form openings 73 in the bowls 74 or objects formed. The rods 72 are fastened to a supporting bar 75, by means of the screws 76.

In Fig. 12 is represented an upper mold 80, a lower mold 81, and a separating plate 82. A rod 83 passes through an opening in the lower mold to form an opening in the bowl 84, and a supporting bar 85 holds the rod 83 in place.

It will be noted that with the molds and other appurtenances shown and described, that any number of objects or bowls can be formed at the same time, depending upon the number of cavities and openings formed in the elements constituting the molds. It is also evident that the molds join in planes horizontal to the vertical axes of the object to be formed, so that any seams formed with the bowls or other objects will be in planes perpendicular to the vertical axes thereof.

In Fig. 13 is represented a sectional view of a pipe bowl 90 with the neck 91, lower mold 92, separating plate 93 and the upper mold 94. Above the molds are shown the plunger 95 for forming the cavity in the bowl, and the plunger 96 for forming the opening in the neck 91. The machine for operating the plungers in this modification will have to be arranged so as to move the plunger 96 in a curved path to form the opening in the neck of the bowl.

Having described my invention, I claim:

1. In a molding machine the combination of a stationary bottom mold, a reciprocating upper mold above the bottom mold, a separating plate between the molds, and reciprocating plungers passing through the upper mold, the separating plate, and into the lower mold.

2. In a molding machine the combination of a stationary bottom mold, a reciprocating upper mold above the bottom mold; pins extending from the bottom mold; a separating plate detachably connected with said pins; reciprocating plungers passing through openings in the upper mold, separating plate, and into cavities of the lower mold.

3. In a molding machine for forming pipes the combination of a stationary bottom mold having a plurality of cavities; a reciprocating upper mold having a plurality of openings therethrough above the lower mold; a separating plate having a plurality of openings matching with the cavities in the lower mold and the said plate detachably connected with the lower mold; reciprocating plungers passing through the openings in the upper mold, separating plate and into the cavities of the lower mold.

4. In a molding machine the combination of a stationary bottom mold having a plurality of cavities therein, a reciprocating upper mold having a plurality of openings matching with the cavities in the lower mold, a separating plate with a plurality of openings matching with the said cavities and said openings detachably connected with the bottom mold, the planes of connection between the plate and molds at right angles to the longitudinal axes of the objects to be formed, and reciprocating plungers passing through the openings of the upper mold and separating plate and passing into the cavities of the lower mold.

5. In a molding machine the combination of a pair of frames, a table connecting the frames, a bottom mold having a plurality of cavities supported on the table, a pair of guides formed with the table, sliding rods passing through the guides, an upper mold with a plurality of openings therethrough matching with the cavities in the lower mold supported on said rods over the bottom mold, means to reciprocate the said sliding rods, and thereby move the upper mold, a cross head engaging openings in the frames and above the upper mold, means to reciprocate said crosshead, separating plate having a plurality of openings between the molds, and plungers connected with the cross-head passing through the openings in the upper mold separating plate and into the cavities of the lower mold.

6. In a molding machine the combination of a pair of frames, a table connecting the frames, a bottom mold having a plurality of cavities supported on the table, a pair of guides formed with the table, sliding rods passing through said guides; an upper mold with a plurality of openings therethrough matching with the cavities in the lower mold, supported on said rods over the bottom mold, a separating plate between the molds having a plurality of openings, a cross-bar connecting the lower ends of the sliding rods; links pivoted to the ends of the cross-bar; a cam shaft journaled in the upper portions of the frames, a cam on each end of the cam shaft; cam levers pinned to said links and engaging with said cams; a cross-head between the frames; ends on the cross-head passing through elongated openings in the frames, pins extending from said ends, a plunger holder connected to the cross-head; plungers adjustably secured to the plunger holder and passing through the openings in the upper mold, separating plate and into the cavities in the lower mold; a second cam at each end of the cam shaft; an oscillating lever fulcrumed on each frame and having an elongated opening engaging with the pin extending from the end of the cross-head, and means to turn the cam shaft.

Signed at the borough of Manhattan in the county of New York and State of New York this 21st day of October A. D. 1907.

HERMANN SONNENBERG.

Witnesses:
 MARTIN ZIMANSKY,
 JOHN J. MILLIN.